(12) United States Patent
Fattal et al.

(10) Patent No.: US 11,011,121 B2
(45) Date of Patent: May 18, 2021

(54) MULTIVIEW BACKLIGHT, DISPLAY, AND METHOD EMPLOYING ACTIVE EMITTER ARRAYS

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/663,167

(22) Filed: Oct. 24, 2019

(65) Prior Publication Data

US 2020/0059639 A1 Feb. 20, 2020

Related U.S. Application Data

(63) Continuation of application No. PCT/US2018/032131, filed on May 10, 2018.
(Continued)

(51) Int. Cl.
*G09G 3/34* (2006.01)
*H04N 13/351* (2018.01)
(Continued)

(52) U.S. Cl.
CPC .......... *G09G 3/342* (2013.01); *G02B 6/0068* (2013.01); *G02B 6/0073* (2013.01);
(Continued)

(58) Field of Classification Search
CPC ...... H04N 13/312; H04N 13/32; H04N 13/31; H04N 2013/405; H04N 13/00;
(Continued)

(56) References Cited

U.S. PATENT DOCUMENTS 6,304,288 B1   10/2001   Hamagishi
7,527,416 B2   5/2009    Lin
(Continued)

FOREIGN PATENT DOCUMENTS

EP    0881844 B1      12/1998
JP    2006039041 A    2/2006
(Continued)

OTHER PUBLICATIONS

International Search Report and Written Opinion (ISRWO) by International Searching Authority (ISA) Korean Intellectual Property Office (KIPO), dated Sep. 11, 2018 (18 pages) for counterpart PCT Application No. PCT/US2018/032131.
(Continued)

*Primary Examiner* — William J Carter
*Assistant Examiner* — Omar Rojas Cadima
(74) *Attorney, Agent, or Firm* — J. Michael Johnson (57) ABSTRACT

A multiview backlight includes a first array active emitters configured to provide a first plurality of directional light beams and a second array of active emitters configured to provide a second plurality of directional light beams. The second array of active emitters is interleaved between active emitters of the first array of active emitters. Further, directional light beams of each of the first and second directional light beam pluralities have directions corresponding to view directions of a multiview display. A multiview display further includes an array of light valves configured to modulate the directional light beams to display a multiview image. An image resolution of the multiview image is configured to be dynamically selectable according to operational mode.

21 Claims, 6 Drawing Sheets

Related U.S. Application Data (60) Provisional application No. 62/505,956, filed on May 14, 2017.

(51) Int. Cl.

| | | |
|---|---|---|
| *H04N 13/356* | (2018.01) | |
| *H04N 13/398* | (2018.01) | |
| *H04N 13/324* | (2018.01) | |
| *H04N 13/32* | (2018.01) | |
| *H04N 13/354* | (2018.01) | |
| *H04N 13/359* | (2018.01) | |
| *F21V 8/00* | (2006.01) | |

(52) U.S. Cl.
CPC ........... *G09G 3/3413* (2013.01); *H04N 13/32* (2018.05); *H04N 13/324* (2018.05); *H04N 13/351* (2018.05); *H04N 13/354* (2018.05); *H04N 13/356* (2018.05); *H04N 13/359* (2018.05); *H04N 13/398* (2018.05); *G09G 2320/0242* (2013.01)

(58) Field of Classification Search
CPC .. H04N 13/305; H04N 13/351; H04N 13/354; H04N 13/368; G02F 1/133504; G02F 2001/133607
See application file for complete search history.

(56) References Cited

U.S. PATENT DOCUMENTS

| | | | | |
|---|---|---|---|---|
| 7,580,186 | B2 * | 8/2009 | Mather | G02F 1/1323 |
| | | | | 359/463 |
| 8,810,750 | B2 | 8/2014 | Mun et al. | |
| 9,128,226 | B2 | 9/2015 | Fattal et al. | |
| 9,201,270 | B2 | 12/2015 | Fattal et al. | |
| 9,279,989 | B2 | 3/2016 | Song et al. | |
| 9,298,168 | B2 | 3/2016 | Taff et al. | |
| 9,372,349 | B2 * | 6/2016 | Brug | G02B 30/27 |
| 9,389,415 | B2 | 7/2016 | Fattal et al. | |
| 9,459,461 | B2 | 10/2016 | Santori et al. | |
| 9,557,466 | B2 | 1/2017 | Fattal | |
| 10,810,917 | B2 | 10/2020 | Fattal | |
| 2005/0046951 | A1 | 3/2005 | Sugihara et al. | |
| 2007/0013624 | A1 | 1/2007 | Bourhill | |
| 2007/0147079 | A1 | 6/2007 | Wu et al. | |
| 2008/0252955 | A1 | 10/2008 | Redert | |
| 2008/0285282 | A1 * | 11/2008 | Karman | H01L 51/0096 |
| | | | | 362/249.16 |
| 2010/0118218 | A1 | 5/2010 | Eichenlaub | |
| 2010/0141868 | A1 | 6/2010 | St. Hilaire et al. | |
| 2010/0245406 | A1 | 9/2010 | Redert et al. | |
| 2011/0157167 | A1 | 6/2011 | Bennett et al. | |
| 2012/0056914 | A1 | 3/2012 | Gass et al. | |
| 2015/0036068 | A1 | 2/2015 | Fattal et al. | |
| 2015/0268479 | A1 | 9/2015 | Woodgate et al. | |
| 2015/0316702 | A1 | 11/2015 | Ilmonen et al. | |
| 2016/0048060 | A1 * | 2/2016 | Chen | G02F 1/136277 |
| | | | | 362/603 |
| 2016/0187556 | A1 | 6/2016 | Bang et al. | |
| 2016/0379394 | A1 * | 12/2016 | Kim | H04N 13/31 |
| | | | | 345/629 |
| 2017/0299793 | A1 | 10/2017 | Fattal | |
| 2018/0011237 | A1 | 1/2018 | Fattal | |
| 2018/0188441 | A1 | 7/2018 | Fattal | |
| 2018/0188691 | A1 | 7/2018 | Fattal | |
| 2018/0196194 | A1 | 7/2018 | Fattal | |
| 2018/0278923 | A1 | 9/2018 | Fattal | |
| 2018/0299608 | A1 | 10/2018 | Fattal et al. | |
| 2018/0306965 | A1 | 10/2018 | Fattal | |
| 2019/0025494 | A1 | 1/2019 | Fattal et al. | |
| 2019/0155105 | A1 | 5/2019 | Aieta et al. | |
| 2019/0302336 | A1 | 10/2019 | Fattal et al. | |

FOREIGN PATENT DOCUMENTS

| | | | |
|---|---|---|---|
| JP | 2104112147 | A | 6/2014 |
| WO | 2018140063 | A1 | 8/2018 |
| WO | 2018182917 | A1 | 10/2018 |
| WO | 2018213101 | A1 | 11/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

MULTIVIEW BACKLIGHT, DISPLAY, AND METHOD EMPLOYING ACTIVE EMITTER ARRAYS

CROSS-REFERENCE TO RELATED APPLICATIONS

This application is a continuation patent application of and claims the benefit of priority to International Application No. PCT/US2018/032131, filed May 10, 2018, which claims priority to U.S. Provisional Patent Application Ser. No. 62/505,956, filed May 14, 2017, the entirety of each of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview backlight and a multiview display that utilizes the multiview backlight. In particular, embodiments consistent with the principles described herein provide a multiview backlight employing arrays of active emitters configured to provide directional light beams having a plurality of different principal angular directions. Further, according to various embodiments, active emitters of the active emitter arrays are sized relative to view pixels of a multiview pixel in a multiview display, and may also be spaced apart from one another in a manner corresponding to a spacing of multiview pixels of the multiview display. According to various embodiments, the different principal angular directions of the light beams provided by the active emitters correspond to different directions of various different views of the multiview display or equivalently of a multiview image displayed by the multiview display, according to various embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast and herein, a 'multiview display' is defined as an electronic display or display system configured to provide different views of a multiview image in or from different view directions. In particular, the different views may represent different perspective views of a scene or object of the multiview image. Uses of multiview backlighting and multiview displays applicable to the display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 1A:
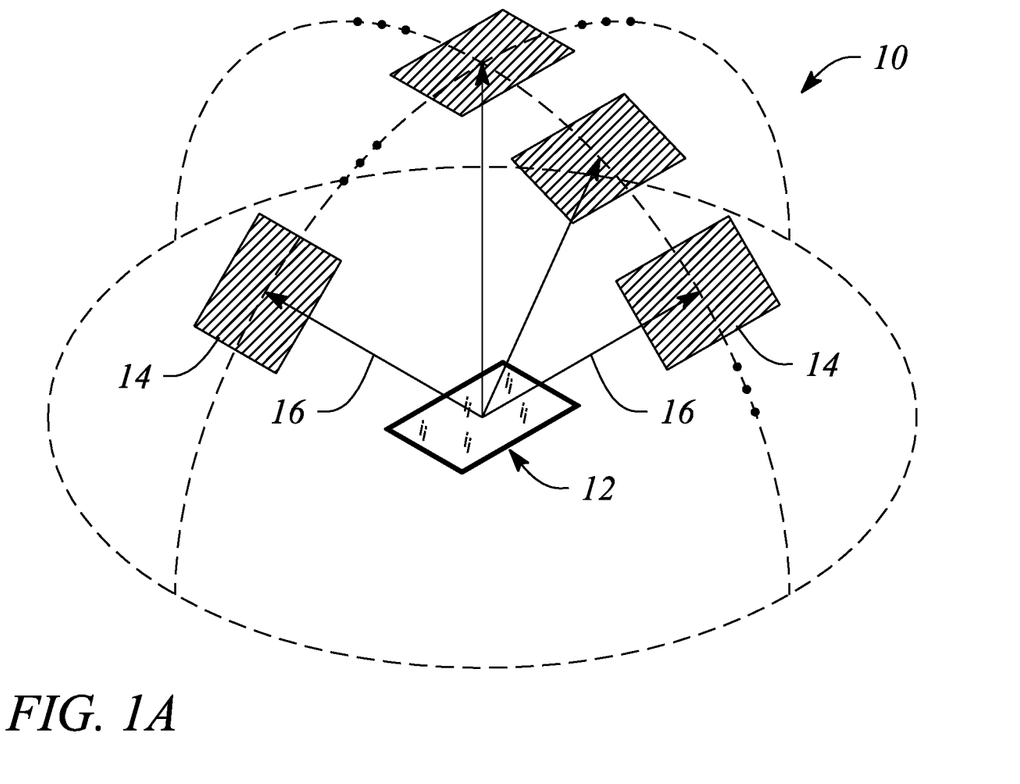
FIG. 1A illustrates a perspective view of a multiview display 10 in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 configured to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
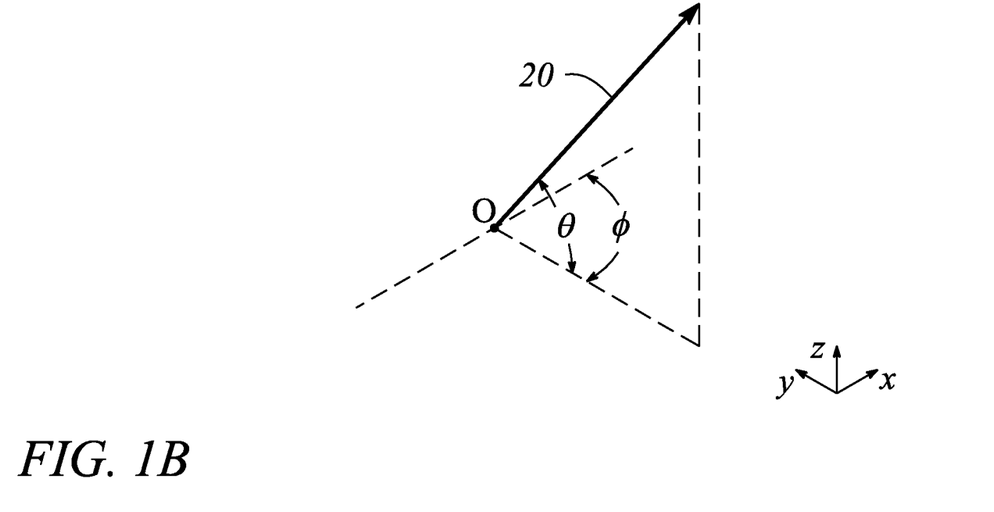
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

The term 'multiview' as used in the terms 'multiview image' and 'multiview display' is defined herein as a plurality of views representing different perspectives or including angular disparity between views of the view plurality. In addition, herein the term 'multiview' explicitly includes two or more different views (e.g., a minimum of three views and generally more than three views), by definition herein. In some embodiments, 'multiview display' as employed herein may be used to explicitly distinguish from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing pixels of views in each of a similar plurality of different views of a multiview display. In particular, a multiview pixel may have an individual view pixels corresponding to or representing a particular view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels corresponding to pixels located at $\{x_1, y_1\}$ in each of the different views of a multiview image, while a second multiview pixel may have individual view pixels corresponding to pixels located at $\{x_2, y_2\}$ in each of the different views, and so on.

In some embodiments, a number of view pixels in a multiview pixel may be equal to a number of views of the multiview display. For example, the multiview pixel may include sixty-four (64) view pixels in associated with a multiview display having or providing 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam principal angular direction) that corresponds to a different one of the view directions corresponding to the 64 different views, for example.

Herein a 'collimator' is defined as substantially any optical device or apparatus that is configured to collimate light. According to various embodiments, an amount of collimation provided by the collimator may vary in a predetermined degree or amount from one embodiment to another. Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, an 'active emitter' is defined as an active source of light (e.g., an optical emitter configured to produce and emit light when activated). As such, an active emitter does not receive light from another source of light, by definition. Instead, the active emitter directly generates light when activated. The active emitter may be activated by applying a power source such as a voltage or a current, by definition herein. For example, the active emitter may comprise an optical emitter such as a light emitting diode (LED) that emits light when activated or turned on. The LED may be activated by applying a voltage to terminals of the LED, for example. In particular, herein the light source may be substantially any active source of light or comprise substantially any active optical emitter including, but not limited to, one or more of a light emitting diode (LED), a laser, an organic light emitting diode (OLED), a polymer light emitting diode, a plasma-based optical emitter, and a micro LED (μLED). The light produced by the active emitter may have a color (i.e., may include a particular wavelength of light), or may be a plurality or range of wavelengths (e.g., polychromatic light or white light). Different colors of light provided or produced by an active emitter may include, but are not limited to, primary colors (e.g., red, green, blue), for example. By definition herein, a 'color emitter' is an active emitter that provides light having a color. In some embodiments, the active emitter may comprise a plurality of active emitters. For example, the active emitter may include a set or group of active emitters. In some embodiments, at least one of the active emitters in the set or group of active emitters may generate light having a color, or equivalently a wavelength, that differs from a color or wavelength of light produced by at least one other optical emitter of the plurality.

Further by definition herein, the term 'broad-angle' as in 'broad-angle emitted light' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (120°). Alternatively, the broad-angle emitted light may have an angular range that is greater than plus and minus forty-five degrees (e.g., >±45° relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°). A 'broad-angle backlight' is a backlight configured to provide broad-angle emitted light, by definition herein.

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an active emitter' means one or more arrays and as such, 'the active emitter' means 'the active emitter(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
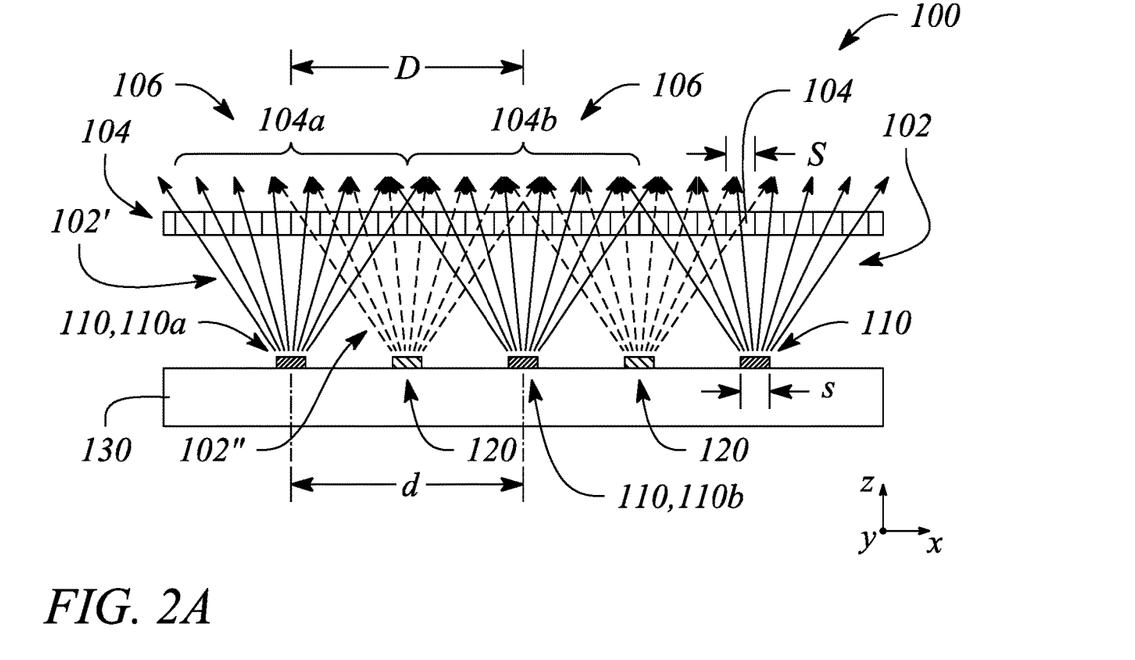
FIG. 2A illustrates a cross-sectional view of a multiview backlight in an example, according to an embodiment consistent with the principles described herein.
Figure 2B:
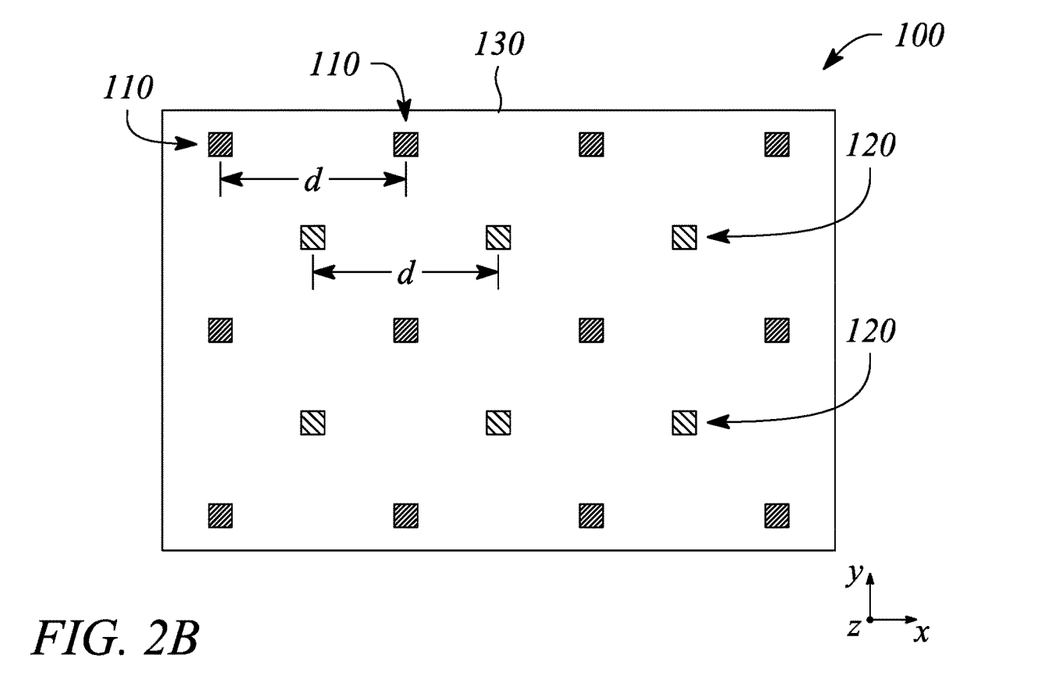
FIG. 2B illustrates a plan view of a multiview backlight in an example, according to an embodiment consistent with the principles described herein.
Figure 2C:
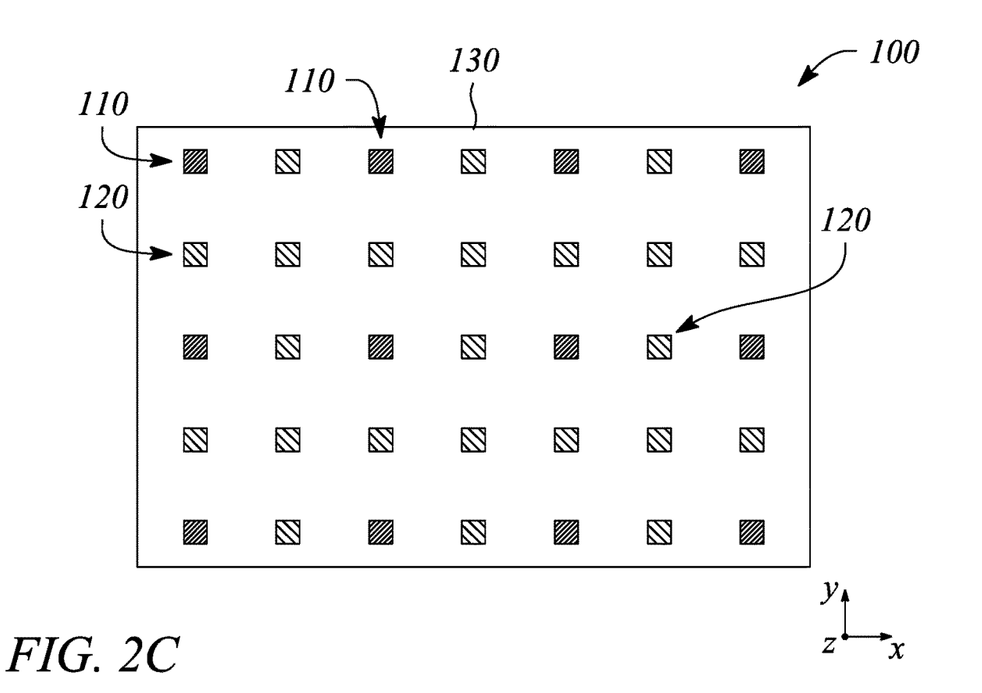
FIG. 2C illustrates a plan view of a multiview backlight in an example, according to another embodiment consistent with the principles described herein.

According to some embodiments of the principles described herein, a multiview backlight is provided. FIG. 2A illustrates a cross-sectional view of a multiview backlight 100 in an example, according to an embodiment consistent with the principles described herein. FIG. 2B illustrates a plan view of a multiview backlight 100 in an example, according to an embodiment consistent with the principles described herein. FIG. 2C illustrates a plan view of a multiview backlight 100 in an example, according to another embodiment consistent with the principles described herein. The multiview backlight 100 is configured to emit or provide directional light beams 102. According to various embodiments, the directional light beams 102 provided by the multiview backlight 100 have directions corresponding to view directions of a multiview display or equivalently of a multiview image displayed by the multiview display.

The multiview backlight 100 illustrated in FIGS. 2A-2C comprises a first array of active emitters 110 spaced apart from one another. In some embodiments, the active emitters 110 may be arranged in a two-dimensional (2D) array (e.g., a rectangular array) having rows and columns, as illustrated in FIGS. 2B and 2C. In other embodiments (not illustrated), the array of active emitters 110 may be either a one-dimensional (1D) such as a linear array or another 2D array including, but not limited to a circular array.

According to various embodiments, an active emitter 110 of the first array of active emitters 110 is configured to emit or provide light as a first plurality of the directional light beams 102'. Further, the directional light beams 102' provided by the active emitter 110 may have directions corresponding to the view directions of a multiview display or equivalently of a multiview image displayed by the multiview display. As such, the directional light beams 102 provided by the multiview backlight 100 may comprise the directional light beams 102' of the first directional light beam plurality provided by the active emitter 110, according to various embodiments. Differently directed, solid-line arrows in FIG. 2A represent directional light beams 102' of the first directional light beam plurality, by way of illustration and not limitation.

As illustrated in FIGS. 2A-2C, the multiview backlight 100 further comprises a second array of active emitters 120. Active emitters 120 of the second active emitter array are also spaced apart from one another, according to various embodiments. In some embodiments, an arrangement of active emitters 120 of the second array of active emitters 120 may be substantially similar to that of the array of active emitters 110, as described above (e.g., a 2D array or a 1D array). Further, the second array of active emitters 120 is interleaved with or between active emitters 110 of the first array of active emitters 110, according to various embodiments. In some embodiments, active emitters 120 of the second active emitter array may be interleaved about halfway between adjacent active emitters 110 of the first active emitter array.

For example, active emitters 120 of the second array of active emitters 120 may alternate with active emitters 110 of the first array of active emitters 110 along a row of the array, as illustrated in FIG. 2A. In another example, as illustrated in FIG. 2B, rows and columns of active emitters 120 of the second active emitter array may be interleaved with rows and columns of the active emitters 110 of the first active emitter array. As such, the active emitters 120 of the second active emitter array may be diagonally offset from the active emitters 110 of the first active emitter array, in some embodiments. In yet another embodiment illustrated in FIG. 2C, the active emitters 120 of the second active emitter array may alternate with active emitters 110 of the first active emitter array along both rows and columns. Further, as illustrated in FIG. 2C, the active emitters 120 of the second active emitter array may also be diagonally offset from adjacent active emitters 110 of the first active emitter array. Therefore, the active emitters 120 may alternate with adjacent active emitters 110 along each of the rows, the columns, and also along diagonals of the array, in some embodiments.

Note, FIGS. 2A-2C also illustrate in different embodiments active emitters 120 of the second active emitter array as being halfway (or centered) between active emitters 110 of the first active emitter array, by way of example and not limitation. In other embodiments (not illustrated), the active emitters 120 of the second active emitter array may be located other than halfway between adjacent active emitters 110 for the first active emitter array.

According to various embodiments, an active emitter 120 of the second array of active emitters 120 is configured to emit or provide light as a second plurality of directional light beams 102". As with the first plurality of directional light beams 102', the directional light beams 102" may have directions corresponding to view directions of a multiview display or equivalently of a multiview image displayed by the multiview display. In particular, the directions of the directional light beams 102" of the second directional light beam plurality may be equivalent to or have the same as the directions of the directional light beams 102 of the first directional light beam plurality, according to various embodiments. As such, the directional light beams 102 provided by the multiview backlight 100 may further comprise the directional light beams 102" of the second directional light beam plurality provided by the active emitter 120. In FIG. 2A, differently directed, dashed-line arrows represent the directional light beams 102" of the second directional light beam plurality, by way of illustration and not limitation. The dashed arrows also distinguish the directional light beams 102" from the directional light beams 102' of the first directional light beam plurality, as illustrated.

According to various embodiments, a size of the active emitters 110, 120 of the first and second active emitter arrays is comparable to a view pixel of a multiview display that employs the multiview backlight 100. In particular, an active emitter size of each of the active emitter 110 of the first active emitter array and the active emitter 120 of the second active emitter array may be comparable to the view pixel size. In some embodiments, the active emitter size may be between about one half (0.5) and about two (2.0) times the view pixel size. For example, the active emitter size may be about equal to the view pixel size. In some embodiments, the view pixel size may be a size of a light valve of an array of light valves used to modulate the directional light beams 102, 102', 102", provided by the multiview backlight 100 used by the multiview display (e.g., see discussion below). The size of the light valve may be an aperture size of the light valve or equivalently a center-to-center between light valves of the light valve array, for example.

In some embodiments, a distance between adjacent active emitters within one or both of the first array of active emitters 110 and the second array of active emitters 120 is comparable to or commensurate with a distance between multiview pixels of the multiview display that employs the multiview backlight 100. In particular, a distance (e.g., center-to-center distance) between adjacent active emitters 110 of the first active emitter array may be about equal to a center-to-center distance between adjacent multiview pixels. The center-to-center distance may be defined along one or both of a row and a column of each of the first array of active emitters 110 with the multiview pixels may be arranged in a commensurate array, for example. Similarly, a center-to-center distance between adjacent active emitters 120 of the second active emitter array may be about equal to a center-to-center distance between adjacent multiview pixels. As a result, there may be a one-to-one or unique correspondence between a multiview pixel and an individual active emitter 110, 120, according to some embodiments.

By way of example and not limitation, FIG. 2A further illustrates an array of light valves 104 as well as multiview pixels 106 and view pixels for the purpose of facilitating discussion herein. The illustrated light valve array may be part of a multiview display that employs the multiview backlight 100, for example. As illustrated, light valves 104 of the light valve array are configured to modulate the directional light beams 102, e.g., the directional light beams 102', 102". Further, different ones of the directional light beams 102 having different principal angular directions pass through and may be modulated by different ones of the light valves 104 in the light valve array, as illustrated.

In some embodiments, a light valve 104 of the light valve array may correspond to a view pixel of the multiview display, while a set of the light valves 104 may correspond to a multiview pixel 106. In particular, a different set of light valves 104 of the light valve array may be configured to receive and modulate the directional light beams 102, 102', 102" from different ones of the active emitters 110, 120. As such, there may be one unique set of light valves 104 (or multiview pixel 106) for each active emitter 110, 120, e.g., as illustrated with respect to active emitters 110. In various embodiments, different types of light valves may be employed as the light valves 104 of the light valve array including, but not limited to, one or more of liquid crystal light valves, electrophoretic light valves, and light valves based on electrowetting.

Further, in FIG. 2A, a size S of a view pixel corresponds to an aperture size of a light valve 104 in the light valve array, as illustrated. In other examples, the view pixel size may be defined as a distance (e.g., a center-to-center distance) between adjacent light valves 104 of the light valve array. For example, an aperture of the light valves 104 may be smaller than the center-to-center distance between the light valves 104 in the light valve array. Thus, the view pixel size may be defined as either the size of the light valve 104 or a size corresponding to the center-to-center distance between the light valves 104, among other definitions. Also in FIG. 2A, a size s of the active emitters 110, 120 is illustrated as comparable to the view pixel size S.

In some embodiments (e.g., as illustrated in FIG. 2A), an inter-element distance (e.g., center-to-center distance) between a pair of adjacent active emitters 110, 120 may be equal to an inter-pixel distance (e.g., a center-to-center distance) between a corresponding pair of adjacent multiview pixels 106, e.g., represented by light valve sets. For example, as illustrated in FIG. 2A, a center-to-center distance d between a first active emitter 110a and a second active emitter 110b is substantially equal to a center-to-center distance D between a first light valve set 104a and the second light valve set 104b, where each light valve set 104a, 104b represents a multiview pixel 106. In other embodiments (not illustrated), the relative center-to-center distances of pairs of active emitters 110a, 110b (or active emitters 120) and corresponding light valve sets 104a, 104b may differ, e.g., the active emitters 110, 120 may have an inter-element spacing (i.e., center-to-center distance d) that is one of greater than or less than a spacing (i.e., center-to-center distance D) between light valve sets representing multiview pixels 106.

In some embodiments, a shape of the active emitter 110, 120 is analogous to a shape of the multiview pixel 106 or equivalently, a shape of the set of the light valves 104 corresponding to the multiview pixel 106. For example, the active emitter 110, 120 may have a square shape and the multiview pixel 106 (or an arrangement of a corresponding set of light valves 104) may be substantially square. In another example, the active emitter 110, 120 may have a rectangular shape, i.e., may have a length or longitudinal dimension that is greater than a width or transverse dimension. In this example, the multiview pixel 106 (or equivalently the arrangement of the set of light valves 104) corresponding to the active emitter 110, 120 may have an analogous rectangular shape. FIGS. 2B-2C illustrate a plan view of square-shaped active emitters 110, 120 and corresponding square-shaped multiview pixels 106 (not illustrated) comprising square sets of light valves 104. In yet other examples (not illustrated), the active emitters 110, 120 and the corresponding multiview pixels 106 have various shapes including or at least approximated by, but not limited to, a triangular shape, a hexagonal shape, and a circular shape. More generally, the shape may represent substantially any tileable shape.

According to some embodiments, an active emitter 110, 120 of one or both of the first active emitter array and the second active emitter array may comprise a micro light emitting diode (microLED or μLED). Herein, μLED is defined as a microscopic light emitting diode (LED), i.e., an LED having microscopic dimensions. In some embodiments, the μLED may comprise a plurality of μLEDs that, when combined, have size that is comparable to the view pixel size. According to some embodiments, an active emitter 110, 120 of one or both of the first active emitter array and the second active emitter array may comprise an organic light emitting diode (OLED). As defined herein, an OLED is an emitter having an emissive electroluminescent film or layer comprising an organic compound configured to emit light in response to an electric current or similar electrical stimulus. In other embodiments, another type of active optical emitter may be used as the active emitter 110, 120 such as, but not limited to, a high intensity LED and a quantum dot LED having a size comparable to the view pixel size.

In some embodiments, the active emitter 110, 120 may be configured to provide light that is substantially monochromatic having a particular color (i.e., the light may include a particular wavelength of light). In other embodiments, the active emitter 110, 120 may be configured to provide polychromatic light such as, but not limited to, white light, that includes a plurality or range of wavelengths. For example, active emitter 110, 120 may be configured to provide one or more of red light, green light, blue light, or a combination thereof. In another example, the active emitter 110, 120 may be configured to provide light that is substantially white light (i.e., the active emitter 110, 120 may be a white μLED or white OLED). In some embodiments, the active emitter 110, 120 may include a micro-lens, a diffraction grating, or another optical film or component configured to provide one or both of collimation (e.g., according to a collimation factor) and polarization control of emitted light or equivalent of the directional light beams 102, 102', 102". The micro-lens, the diffraction grating, or the other optical film or component may also or alternatively be configured to control a direction of the directional light beams 102, 102', 102". Alternatively, one or both of the collimation and polarization control may be provided by an optical layer or film between the active emitter arrays and the light valve array, for example.

Active emitters 110, 120 of the first and second active emitter arrays may be independently controlled, activated, or powered to provide local dimming and also to enable switching between directional light beam production by the first and second active emitter arrays, according to some embodiments. In particular, in some embodiments, the active emitter(s) 110 of the first active emitter array may be configured to provide by selective activation the first plurality of directional light beams 102', e.g., during a first time interval or a particular mode. Similarly, the active emitter(s) 120 of the second active emitter array may be configured to provide the second plurality of directional light beams 102" by selective activation, e.g., during a second time interval or a particular mode. In various embodiments, the first time interval and the second time interval may be alternating, sequential time intervals, as described further below.

Figure 3A:
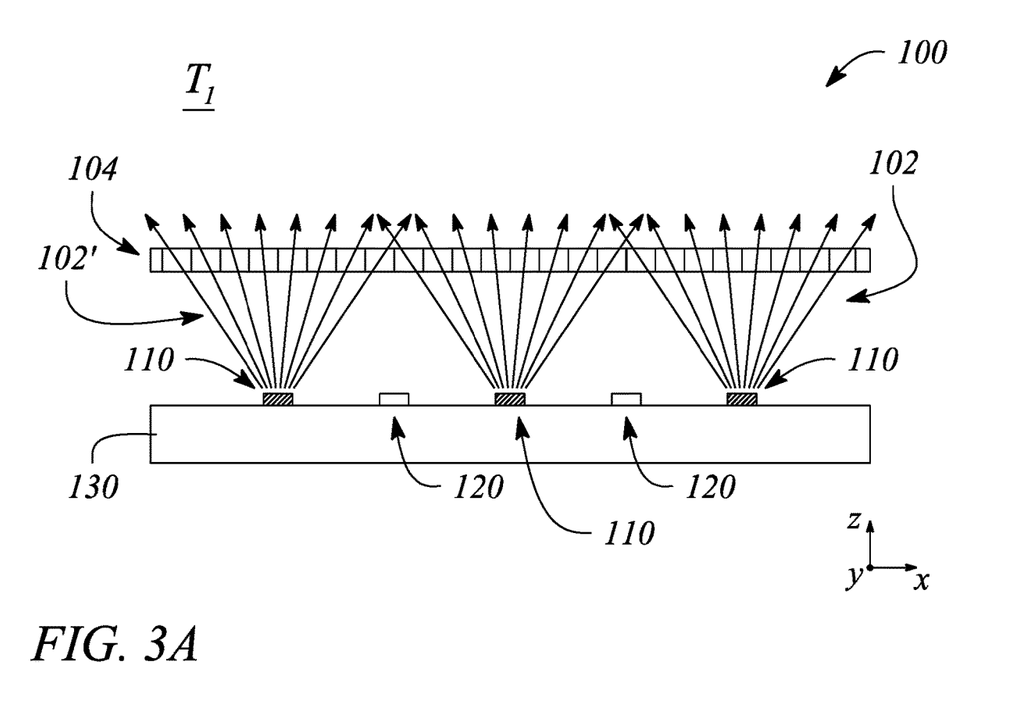
FIG. 3A illustrates a cross-sectional view of a multiview backlight in an example, according to an embodiment of the principles described herein.
Figure 3B:
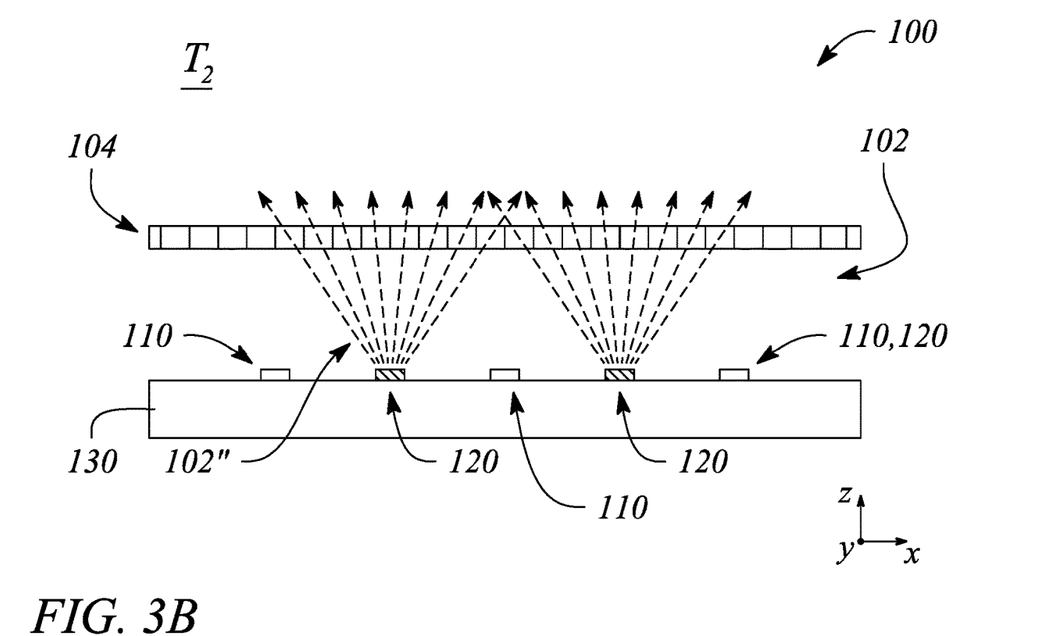
FIG. 3B a cross-sectional view of the multiview backlight of FIG. 3A in an example, according to an embodiment of the principles described herein.

FIG. 3A illustrates a cross-sectional view of a multiview backlight 100 in an example, according to an embodiment of the principles described herein. FIG. 3B a cross-sectional view of the multiview backlight 100 of FIG. 3A in an example, according to an embodiment of the principles described herein. The multiview backlight 100 illustrated in FIGS. 3A-3B comprises the first array of active emitters 110 and the second array of active emitters 120. The array of light valves 104 is also illustrated in FIGS. 3A-3B.

As illustrated, the multiview backlight 100 is configured to provide selective activation of the first and second active emitter arrays during different time intervals. In particular, FIG. 3A illustrates the multiview backlight 100 during a first time interval $T_1$ and FIG. 3B illustrates the multiview backlight 100 during a second time interval $T_2$. During the first time interval $T_1$ (FIG. 3A), the first array of active emitters 110 is selectively activated to provide the first plurality of directional light beams 102', while the second array of active emitters 120 is selectively activated to provide the second plurality of directional light beams 102" during the second time interval $T_2$. The first time interval $T_1$ and the second time interval $T_2$ may alternate in a time-sequential manner, for example. As such, the array of light valve 104 may be time multiplexed such that directional light beams 102' provided by the first array of active emitters 110 are modulated during the first time interval $T_1$ and directional light beams 102" provided by the second array of active emitters 120 are modulated during the second time interval $T_2$, according to some embodiments.

Time multiplexing of the array of light valves 104 may provide an effective doubling of a resolution of a multiview image displayed by a multiview display that includes the multiview backlight 100 and array of light valves 104, as illustrated in FIGS. 3A-3B when compared to the same multiview display in which time multiplexing is not employed, for example. Moreover, the multiview image resolution may be selectively increased or decreased by either using or not using time multiplexing, according to various embodiments. Note that, as illustrated in FIGS. 3A-3B, the displayed multiview image may include four different views by way of example and not limitation.

In other embodiments, the first array of active emitters 110 may be configured to provide the first plurality of directional light beams 102' during a first mode of the multiview backlight 100. In particular, the first array of active emitters 110 may be activated during the first mode. The second array of active emitters 120 may be inactivated during the first mode, for example. Further, during a second mode, both the first array of active emitters 110 may be configured to provide the first plurality of directional light beams 102' and the second array of active emitters 120 may be configured to provide the second plurality of directional light beams 102" during a second mode of the multiview backlight 100. In particular, both the first and second active emitter arrays may be activated during the second mode.

Figure 4A:
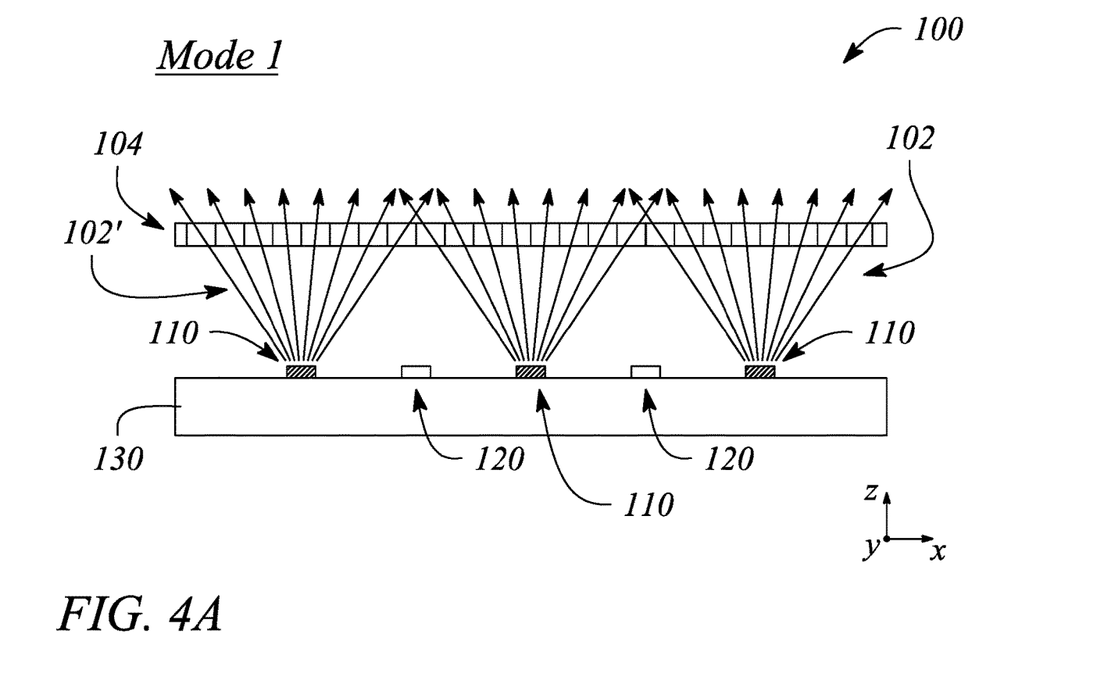
FIG. 4A illustrates a cross-sectional view of a multiview backlight in an example, according to an embodiment of the principles described herein.
Figure 4B:
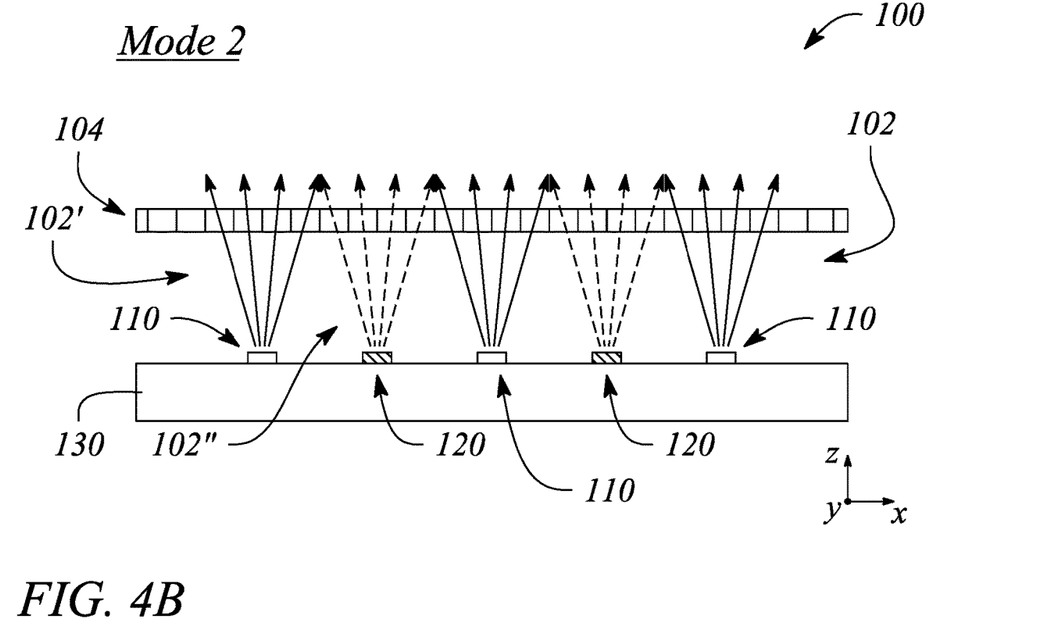
FIG. 4B a cross-sectional view of the multiview backlight of FIG. 4A in an example, according to an embodiment of the principles described herein.

FIG. 4A illustrates a cross-sectional view of a multiview backlight 100 in an example, according to an embodiment of the principles described herein. FIG. 4B a cross-sectional view of the multiview backlight 100 of FIG. 4A in an example, according to an embodiment of the principles described herein. The multiview backlight 100 illustrated in FIGS. 4A-4B comprises the first array of active emitters 110 and the second array of active emitters 120. The array of light valves 104 is also illustrated in FIGS. 4A-4B. Further, the multiview backlight 100 is illustrated during or in a first mode (Mode 1) in FIG. 4A, while the multiview backlight 100 is illustrated in FIG. 4B during or in a second mode (Mode 2).

In particular, FIG. 4A illustrates the multiview backlight 100 during the first mode (Mode 1) in which active emitters 110 of the first active emitter array are activated and active emitters 120 of the second active emitter array are inactivated. As illustrated, the active emitters 110 provide the directional light beams 102' of the first directional light beam plurality when activated during the first mode (Mode 1). These directional light beams 102' may be modulated by the array of light valves 104 to provide a multiview image having a first quantity or number of different views characterized by a multiview pixel 106. In particular, the multiview pixel 106 associated with an active emitter 110 during the first mode includes view pixels corresponding to eight (8) different views, as illustrated in FIG. 4A by way of example and not limitation.

FIG. 4B illustrates the multiview backlight 100 during the second mode (Mode 2) in which both the active emitters 110 of the first active emitter array and the active emitters 120 of the second active emitter array are activated simultaneously. As illustrated, the active emitters 110, 120 provide directional light beams 102', 102" of both the first directional light beam plurality and the second directional light beam plurality when activated. In each of the first and second modes, light valves 104 of the light valve array may be used to modulate the directional light beams 102 (e.g., only the directional light beams 102' in the first mode and directional light beams 102', 102" during the second mode) to provide the multiview image. Moreover, a resolution of the multiview image may be increase (e.g., doubled) in the second mode (Mode 2) compared to the resolution in the first mode (Mode 1). Of course, as illustrated in FIGS. 4A-4B, a quantity or number of views of the multiview image provided in the second mode (Mode 2) is be less than (e.g., half of) a number of views of the multiview image provided in the first mode (Mode 1). In particular, multiview pixels 106 are associated with each of the active emitters 110, 120 and each of the multiview pixels 106 includes view pixels corresponding to four (4) different views in the second mode (Mode 2), as illustrated in FIG. 4B by way of example and not limitation. Accordingly, switching between the first mode (Mode 1) and the second mode (Mode 2) may facilitate switching between a greater number of views (lower resolution) and a higher resolution (fewer views) of the multiview image.

Referring again to FIG. 2A, the multiview backlight 100 may further comprise a planar substrate 130, in some embodiments. In particular, the active emitters 110, 120 may be spaced apart across a surface of the planar substrate 130. The planar substrate 130 may further comprise electrical interconnects to provide power to the active emitters 110, 120. In some embodiments, the planar substrate 130 is configured to be optically transparent or at least substantially optically transparent (i.e., may be a planar transparent substrate). For example, the planar substrate 130 may comprise an optically transparent material capable of transmitting light from a first side to a second side of the planar substrate 130. Further, electrical interconnects may be optically transparent, in some embodiments. Moreover, a combination of the first and second arrays of active emitters 110, 120 and the planar substrate 130 (e.g., along with the electrical interconnects) may be configured to be optically transparent, in some embodiments.

According to some embodiments, the multiview backlight 100 may further comprise a broad-angle backlight adjacent to the planar substrate 130. The broad-angle backlight may be configured to provide broad-angle emitted light. Further, a combination of the first and second arrays of active emitters 110, 120 and the planar substrate 130 may be configured to be transparent to the broad-angle emitted light, according to various embodiments.

Figure 5:
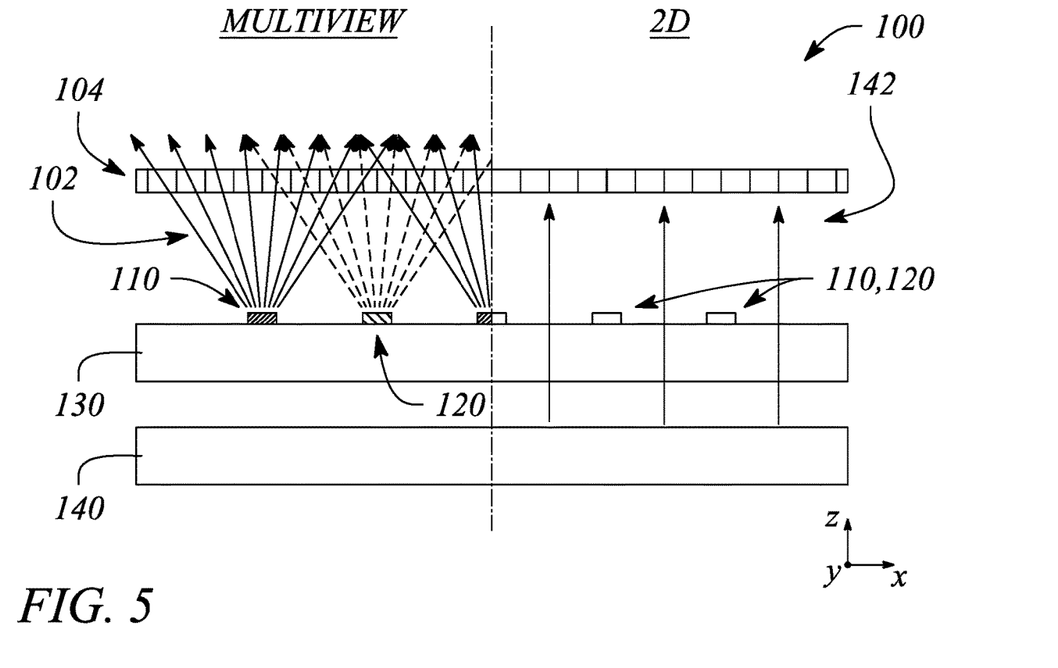
FIG. 5 illustrates a cross-sectional view of a multiview backlight including a broad-angle backlight in an example, according to an embodiment consistent with the principles described herein.

FIG. 5 illustrates a cross-sectional view of a multiview backlight 100 including a broad-angle backlight 140 in an example, according to an embodiment consistent with the principles described herein. In particular, FIG. 5 illustrates the broad-angle backlight 140 adjacent to a surface of the planar substrate 130 with active emitters 110, 120 arranged on an opposite surface. FIG. 5 further illustrates an array of light valves 104 adjacent to the opposite surface of the planar substrate 130.

As illustrated on a left side of FIG. 5, a multiview image (MULTIVIEW) may be provided using the multiview backlight 100 by activating the active emitters 110, 120 to provide directional light beams 102, e.g., one or both of directional light beams 102', 102", as variously described and illustrated above. Alternatively, as illustrated on a right side of FIG. 5, a two-dimensional (2D) image may be provided by inactivating the active emitters 110, 120 and activating the broad-angle backlight 140 to provide broad-angle emitted light 142 to the array of light valves 104. As such, the multiview backlight 100 including the broad-angle backlight 140 and the planar substrate 130 configured to be transparent may be used to implement an electronic display that may be switched between displaying a multiview image and displaying a 2D image, according to various embodiments. Herein, active emitters 110, 120 are illustrated as being activated by using crosshatching, while active emitters 110, 120 without crosshatching represent an inactivated state or condition.

In accordance with some embodiments of the principles described herein, a multiview display is provided. The multiview display is configured to display a multiview image, according to various embodiments. Further, an image resolution of the multiview image is configured to be dynamically selectable according to an operational mode, according to various embodiments. In some embodiments, image resolution and a number of different views of the multiview image are dynamically selectable.

Figure 6:
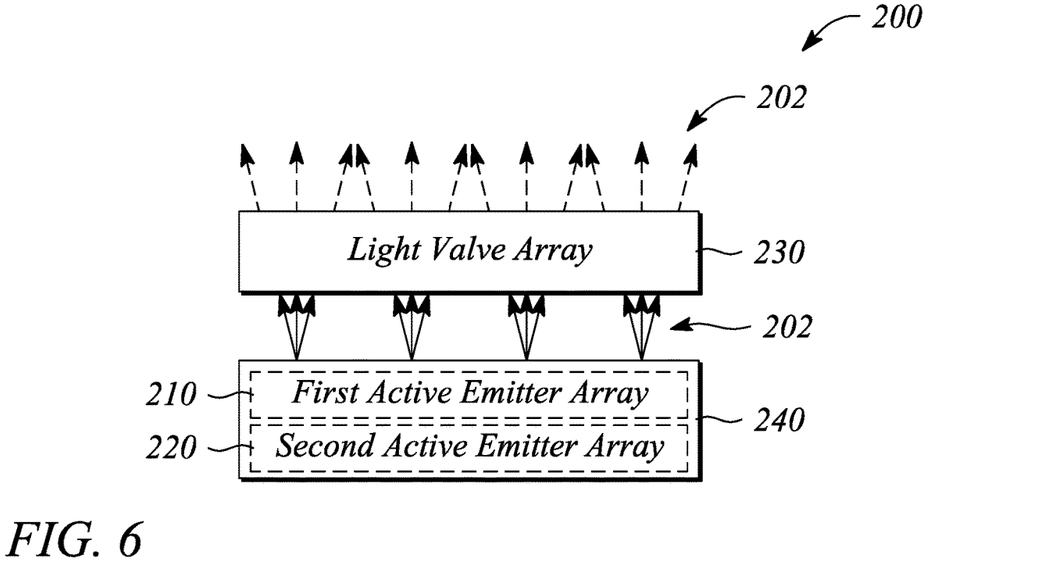
FIG. 6 illustrates a block diagram of a multiview display in an example, according to an embodiment consistent with the principles described herein.

FIG. 6 illustrates a block diagram of a multiview display 200 in an example, according to an embodiment consistent with the principles described herein. As illustrated, the multiview display 200 comprises a first active emitter array 210. The first active emitter array 210 is configured to provide directional light beams 202 having directions corresponding to view directions of the multiview image. In particular, each active emitter of the first active emitter array 210 is configured to provide a plurality of the directional light beams 202, directional light beams 202 of the directional light beam plurality provided by the active emitter having different directions from one another and further having directions of or corresponding to the view directions.

The multiview view display 200 illustrated in FIG. 6 further comprises a second active emitter array 220, the second active emitter array 220 being interleaved with the first active emitter array 210 on a surface of a substrate 240. As with the first active emitter array 210, the second active emitter array 220 is configured to provide directional light beams 202 having directions corresponding to the view directions of the multiview image. In particular, each active emitter of the second active emitter array 220 is configured to provide a plurality of the directional light beams 202, directional light beams 202 of the directional light beam plurality provided by the active emitter having different directions from one another and further having directions of or corresponding to the view directions. Further, the directions of the directional light beams 202 provided by the second active emitter array may be substantially similar to the directions of the directional light beams 202 provided by the first active emitter array 210.

As illustrated in FIG. 6, the multiview display 200 further comprises an array of light valves 230. The array of light valves 230 is configured to modulate the directional light beams 202 provided by one or both of the first and second active emitter arrays 210, 220. In particular, the array of light valves is configured to modulate the directional light beams 202 to display the multiview image, according to various embodiments.

In some embodiments, the first active emitter array 210 may be substantially similar to the first array of active emitters 110, described above with respect to the multiview backlight 100. In some embodiments, the second active emitter array 210 may be substantially similar to the second array of active emitters 120, also of the above-described multiview backlight 100. In particular, in some embodiments, a size of an active emitter of the first and second active emitter arrays 210, 220 is commensurate to a size of a light valve of the array of light valves 230. In some embodiments, a shape of the active emitter is comparable to a shape of a multiview pixel of the multiview display 200. Further, active emitters of the first and second active emitter arrays 210, 220 may comprise one or both of a micro light emitting diode (μLED) and an organic light emitting diode (OLED), in some embodiments. Further, the substrate 240 on which the first and second active emitter arrays 210, 220 are located may be optically transparent, in some embodiments.

According to some embodiments, image resolution of the multiview image displayed by multiview display 200 may have a first value in a first operational mode and a second value in a second operational mode. In particular, the first operational mode may comprise the first active emitter array 210 being activated to provide the directional light beams 202 and the second active emitter being inactivated. The first operational mode may be configured to provide the multiview image having a first image resolution.

In some embodiments, the second operational mode may comprise both the first active emitter array 210 and the second active emitter array being activated to simultaneously provide the directional light beams 202. The second operational mode may be configured to provide the multiview image having a second image resolution, where the second image resolution is greater than the first image resolution, according to some embodiments. For example, the first operational mode may be substantially similar to the first mode (Mode 1) of the multiview backlight 100, while the second operational mode may be substantially similar to the second mode (Mode 2) of the multiview backlight 100, as described above with reference to FIG. 4A and FIG. 4B, respectively. Selecting between the first operational mode and the second operational mode may provide dynamic selection of the image resolution albeit with a concomitant change in a number of views of the multiview image, according to various embodiments (e.g., also as described above).

In other embodiments, the second operational mode may comprise the first active emitter array 210 being activated to provide the directional light beams 202 during a first time interval and the second active emitter array 220 being activated to provide the directional light beams 202 during a second time interval, the first and second time intervals being alternating, sequential time intervals. For example, the second operational mode may be substantially similar to the light valve array time-multiplexing described above with respect to the multiview backlight 100 with reference to FIGS. 3A and 3B. As above, selecting between the first operational mode and the second operational mode may provide dynamic selection of the image resolution (e.g., with and without using time-multiplexing), according to various embodiments.

In some embodiments (not illustrated), the multiview display 200 may further comprise a broad-angle backlight configured to provide broad-angle emitted light. According to various embodiments, the broad-angle backlight may be located adjacent to another surface of the substrate opposite to the surface on which the first and second active emitter arrays 210, 220 are interleaved. In some embodiments, the broad-angle backlight may be substantially similar to the broad-angle backlight 140 of the multiview backlight 100, illustrated and described with respect to FIG. 5. In particular, a combination of the first and second active emitter arrays 210, 220 and the substrate 240 may be configured to be transparent to the broad-angle emitted light, according to some embodiments.

Figure 7:
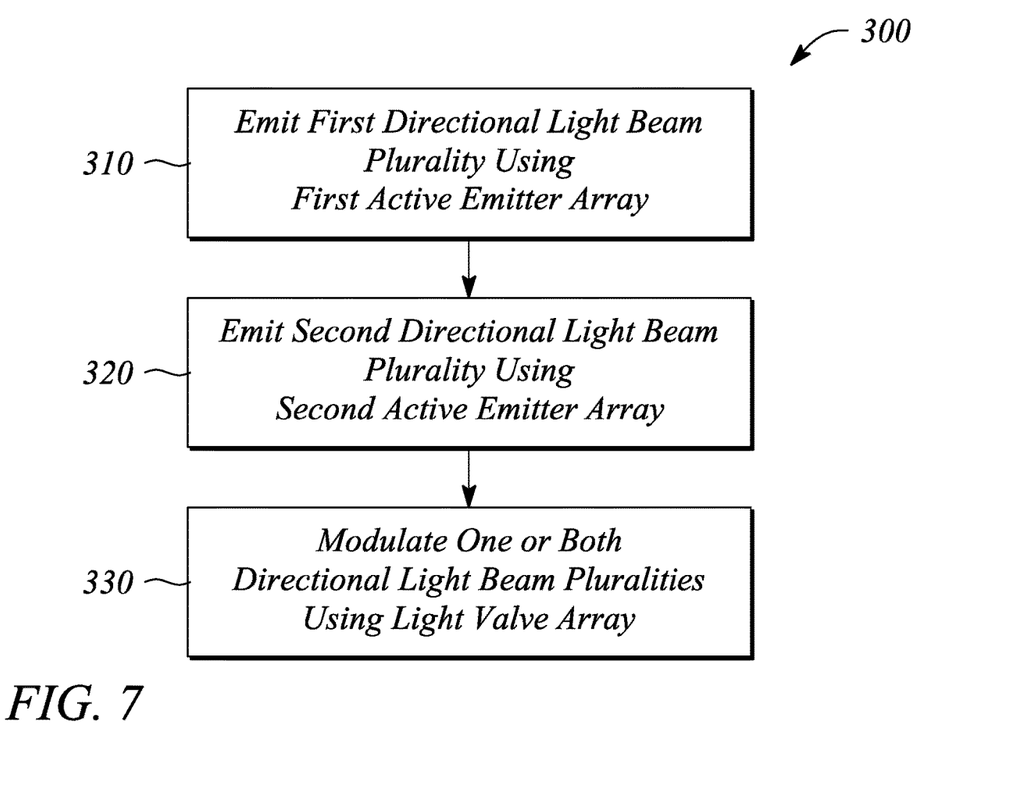
FIG. 7 illustrates a flow chart of a method of multiview backlight operation in an example, according to an embodiment of the principles described herein.

In accordance with some embodiments of the principles described herein, a method of multiview backlight operation is provided. FIG. 7 illustrates a flow chart of a method 300 of multiview backlight operation in an example, according to an embodiment of the principles described herein. The method 300 of multiview backlight operation illustrated in FIG. 7 comprises emitting 310 a first plurality of directional light beams using a first array of active emitters. In particular, directional light beams of the first plurality of directional light beams have directions corresponding to view directions of a multiview image, according to various embodiments. In some embodiments, the first array of active emitters may be substantially similar to the first array of active emitters 110, described above with respect to the multiview backlight 100.

The method 300 illustrated in FIG. 7 further comprises emitting 320 a second plurality of directional light beams using a second array of active emitters interleaved with active emitters of the first active emitter array. In particular, directional light beams of the second plurality of directional light beams are emitted having directions corresponding to the view directions of the multiview image. In some embodiments, the second array of active emitters may be substantially similar to the second array of active emitters 120, of the above-described multiview backlight 100.

According to various embodiments, an active emitter of one or both of the first and second active emitter arrays may have a size comparable to a size of a view pixel of a multiview display used to display the multiview image. For example, the view pixel may correspond to a light valve of the light valve array used to modulate the directional light beams and the active emitter may have a size corresponding to a size or a distance between light valves of the light valve array. In some embodiment, the comparable size of the active emitter may be between one half (0.5) and two times (2X) the view pixel size.

In some embodiments, as illustrated in FIG. 7, the method 300 of multiview backlight operation further comprises modulating 330 one or both of the first plurality of directional light beams and the second plurality of light beams using an array of light valves to display the multiview image. In some embodiments, the array of light valves may be substantially similar to the array of light valves 104, 230, described above with respect to either the multiview backlight 100 or the multiview display 200. In some embodiments, a set of light valves of the array of light valves may correspond to a multiview pixel of a multiview display, while an individual light valve may correspond to a view pixel.

In some embodiments, emitting 310 the first plurality of light beams may be performed during a first time interval and emitting 320 the second plurality of light beams is performed during a second time interval, the first and second time intervals alternating in a time sequential manner. These embodiments may be used when multiplexing the array of light valves, as described above in conjunction with the multiview backlight 100, with reference to FIGS. 3A-3B.

In other embodiments, emitting 310 the first plurality of directional light beams may be performed during a first operational mode. Further, both emitting 310 the first plurality of directional light beams and emitting 320 the second plurality of light beams may be performed during a second operational mode. These embodiments may be used to provide selection between a first image resolution and a second image resolution of the multiview image, as described above in conjunction with the multiview backlight 100, with reference to FIGS. 4A-4B.

Thus, there have been described examples and embodiments of a multiview backlight, a multiview display, and a method of operating a multiview backlight that employ a plurality of arrays of active emitters. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
a first array of active emitters spaced apart from one another, an active emitter of the first array of active emitters being configured to provide a first plurality of directional light beams having directions corresponding to view directions of a multiview display;
a second array of active emitters interleaved between active emitters of the first array of active emitters, an active emitter of the second array of active emitters being configured to provide a second plurality of directional light beams having directions corresponding to the view directions of the multiview display; and
a broad-angle backlight configured to provide broad-angle emitted light, a combination of the first and second arrays of active emitters being configured to be transparent to the broad-angle emitted light,
wherein the active emitters of the first and second active emitter arrays have a size comparable to a size of a view pixel of the multiview display.

2. The multiview backlight of claim 1, wherein a distance between adjacent active emitters within one or both of the first array of active emitters and the second array of active emitters is comparable to a distance between adjacent multiview pixels of the multiview display.

3. The multiview backlight of claim 1, wherein active emitters of the second array of active emitters are halfway between adjacent active emitters of the first active emitter array.

4. The multiview backlight of claim 1, wherein the active emitter of one or both of the first array of active emitters and the second array of active emitters comprises a micro light emitting diode (µLED).

5. The multiview backlight of claim 1, wherein the active emitter of one or both of the first array of active emitters and the second array of active emitters comprises an organic light emitting diode (OLED).

6. The multiview backlight of claim 1, wherein the active emitter of the first array of active emitters is configured to provide the first plurality of directional light beams during a first time interval and the active emitter of the second array of active emitters is configured to provide the second plurality of directional light beams during a second time interval, the first and second time intervals being alternating, sequential time intervals.

7. The multiview backlight of claim 1, wherein the first array of active emitters is configured to provide the first plurality of directional light beams during a first mode of the multiview backlight, and wherein both the first array of active emitters is configured to provide the first plurality of directional light beams and the second array of active emitters is configured to provide the second plurality of directional light beams during a second mode of the multiview backlight.

8. The multiview backlight of claim 1, further comprising a planar substrate adjacent to the broad-angle backlight and configured to be optically transparent to the broad-angle emitted light, active emitters of the first and second active emitter arrays being spaced apart across a surface of the planar substrate.

9. A display comprising the multiview backlight of claim 1, the display further comprising an array of light valves configured to modulate directional light beams of one or both of the first plurality of directional light beams and the second plurality of directional light beams to provide a multiview image, a view pixel corresponding to a light valve of the array of light valves, a multiview pixel corresponding to a set of light valves of the array of light valves, and the display being the multiview display.

10. A multiview display comprising:
   a first active emitter array configured to provide directional light beams having directions corresponding to view directions of a multiview image;
   a second active emitter array interleaved with the first active emitter array on a surface of a substrate, the second active emitter array being configured to provide directional light beams having directions corresponding to the view directions of the multiview image;
   a broad-angle backlight configured to provide broad-angle light, the broad-angle backlight being adjacent to another surface of substrate opposite to the surface on which the first and second active emitter arrays are interleaved; and
   an array of light valves configured to modulate the directional light beams provided by one or both of first and second active emitter arrays to display the multiview image,
   wherein a combination of the first and second active emitter arrays and the substrate is configured to be transparent to the broad-angle emitted light, an image resolution of the multiview image being configured to be dynamically selectable according to an operational mode.

11. The multiview display of claim 10, wherein one or both of a size of an active emitter of the first and second active emitter arrays is commensurate to a size of a light valve of the array of light valves and a shape of the active emitter is comparable to a shape of a multiview pixel of the multiview display.

12. The multiview display of claim 10, wherein active emitters of the first and second active emitter arrays comprise one or both of a micro light emitting diode and an organic light emitting diode.

13. The multiview display of claim 10, wherein the image resolution of the multiview image has a first value in a first operational mode and a second value in a second operational mode, the first operational mode comprising the first active emitter array being activated to provide the directional light beams and the second active emitter being inactivated.

14. The multiview display of claim 13, wherein the second operational mode comprises both the first active emitter array and the second active emitter array being activated to simultaneously provide the directional light beams.

15. The multiview display of claim 13, wherein the second operational mode comprises the first active emitter array being activated to provide the directional light beams during a first time interval and the second active emitter array being activated to provide the directional light beams during a second time interval, the first and second time intervals being alternating, sequential time intervals.

16. A method of multiview backlight operation, the method comprising:
   emitting a first plurality of directional light beams using a first array of active emitters, directional light beams of the first plurality of directional light beams having directions corresponding to view directions of a multiview image; and
   emitting a second plurality of directional light beams using a second array of active emitters interleaved with active emitters of the first active emitter array, directional light beams of the second plurality of directional light beams having directions corresponding to the view directions of the multiview image;
   emitting broad-angle emitted light using a broad-angle backlight adjacent to a substrate supporting the first and second arrays of active emitters, a combination of the first and second arrays of active emitters and the substrate being transparent to the broad-angle emitted light,
   wherein the active emitters have a size comparable to a size of a view pixel of a multiview display used to display the multiview image.

17. The method of multiview backlight operation of claim 16, further comprising modulating one or both of the first plurality of directional light beams and the second plurality of light beams using an array of light valves to display the multiview image.

18. The method of multiview backlight operation of claim 16, wherein emitting the first plurality of light beams is performed during a first time interval and emitting the second plurality of light beams is performed during a second time interval, the first and second time intervals alternating in a time sequential manner.

19. The method of multiview backlight operation of claim 16, wherein emitting the first plurality of directional light beams is performed during a first operational mode and wherein both emitting the first plurality of directional light beams and emitting the second plurality of light beams is performed during a second operational mode.

20. The method of multiview backlight operation of claim 16, further comprising modulating the broad-angle emitted light to provide a two-dimensional (2D) image.

21. The method of multiview backlight of claim 20, wherein the first and second arrays of active emitters are inactivated when the 2D image is provided by modulating the broad-angle emitted light.

* * * * *